(12) United States Patent
Bellamy et al.

(10) Patent No.: US 10,847,046 B2
(45) Date of Patent: Nov. 24, 2020

(54) LEARNING WITH SMART BLOCKS

(71) Applicant: International Business Machines Corporation, Armonk, NY (US)

(72) Inventors: Rachel Katherine Emma Bellamy, Yorktown Heights, NY (US); Ravindranath Kokku, Yorktown Heights, NY (US); Satyanarayana Venkata Nitta, Yorktown Heights, NY (US); Yedendra Babu Shrinivasan, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 178 days.

(21) Appl. No.: 15/413,395

(22) Filed: Jan. 23, 2017

(65) Prior Publication Data
US 2018/0211550 A1 Jul. 26, 2018

(51) Int. Cl.
| | |
|---|---|
| G09B 1/32 | (2006.01) |
| A63H 33/04 | (2006.01) |
| G09B 5/02 | (2006.01) |
| G09B 19/02 | (2006.01) |
| G09B 19/00 | (2006.01) |
| G06N 20/00 | (2019.01) |
| G06N 5/04 | (2006.01) |

(52) U.S. Cl.
CPC .......... *G09B 1/325* (2013.01); *A63H 33/042* (2013.01); *G06N 5/04* (2013.01); *G06N 20/00* (2019.01); *G09B 5/02* (2013.01); *G09B 19/00* (2013.01); *G09B 19/025* (2013.01); *A63H 2200/00* (2013.01)

(58) Field of Classification Search
CPC .......... G09B 1/325; G09B 5/02; G09B 19/00; G09B 19/025; A63H 33/042; G06N 3/006; G06N 99/005
See application file for complete search history.

(56) References Cited

U.S. PATENT DOCUMENTS

| | | | | |
|---|---|---|---|---|
| 3,346,775 A | * | 10/1967 | Godtfred | .............. H05K 1/0286 361/738 |
| 3,594,689 A | * | 7/1971 | Hopt | .................... A63H 33/042 361/735 |

(Continued)

OTHER PUBLICATIONS

Wang, D., Wang, T. & Liu, Z. (2014). "A Tangible Programming Tool for Children to Cultivate Computational Thinking". *The Scientific World Journal.* doi: 10.1155/2014/428080.

(Continued)

*Primary Examiner* — Xuan M Thai
*Assistant Examiner* — Sadaruz Zaman
(74) *Attorney, Agent, or Firm* — Kevin M. Jordan, Esq.; McGinn IP Law Group, PLLC

(57) ABSTRACT

A smart block control method, system, and computer program product, include capturing an intent of using one or more smart blocks and a domain of the smart blocks, determining an order of each of the smart blocks relative to each other, calculating an accuracy of a determined order of the smart blocks compared with the intent, and outputting an instruction via the one or more the smart blocks, in response to said calculating the accuracy of the determined order of the smart blocks compared with the predetermined order of the smart blocks.

4 Claims, 8 Drawing Sheets

(56) References Cited

U.S. PATENT DOCUMENTS

| | | | | |
|---|---|---|---|---|
| 4,556,393 A * | 12/1985 | Bolli | | A63H 33/042 |
| | | | | 446/91 |
| 6,443,796 B1 * | 9/2002 | Shackelford | | A63H 33/042 |
| | | | | 273/237 |
| 6,805,605 B2 * | 10/2004 | Reining | | A63H 33/086 |
| | | | | 446/484 |
| 7,347,760 B2 | 3/2008 | Wood et al. | | |
| 7,421,391 B1 * | 9/2008 | Merkel | | G06Q 30/02 |
| | | | | 704/270 |
| 8,057,233 B2 | 11/2011 | Owen | | |
| 8,079,890 B2 | 12/2011 | Seligman | | |
| 8,602,857 B2 | 12/2013 | Morichau-Beauchant et al. | | |
| 8,821,182 B2 * | 9/2014 | Hayman | | H01R 13/00 |
| | | | | 439/359 |
| 2006/0004567 A1 * | 1/2006 | Russell | | G09B 5/06 |
| | | | | 704/209 |
| 2006/0111902 A1 * | 5/2006 | Julia | | G09B 5/06 |
| | | | | 704/236 |
| 2007/0048697 A1 * | 3/2007 | Du | | G09B 5/04 |
| | | | | 434/156 |
| 2009/0197658 A1 * | 8/2009 | Polchin | | A63F 13/02 |
| | | | | 463/9 |
| 2009/0215357 A1 * | 8/2009 | Seligman | | A63H 33/042 |
| | | | | 446/127 |
| 2009/0317776 A1 * | 12/2009 | Keim | | G09B 19/06 |
| | | | | 434/157 |
| 2013/0109267 A1 * | 5/2013 | Schweikardt | | A63H 33/04 |
| | | | | 446/85 |
| 2014/0342834 A1 * | 11/2014 | Tappeiner | | A63H 30/04 |
| | | | | 463/42 |
| 2014/0378023 A1 * | 12/2014 | Muthyala | | G06T 19/00 |
| | | | | 446/91 |
| 2015/0294595 A1 | 10/2015 | Hu et al. | | |
| 2016/0314255 A1 * | 10/2016 | Cook | | G06N 99/005 |
| 2016/0375372 A1 * | 12/2016 | Anderson | | A63H 27/12 |
| | | | | 446/484 |
| 2017/0036132 A1 * | 2/2017 | Yang | | A63H 33/042 |
| 2017/0061824 A1 * | 3/2017 | Kernan | | G09B 19/06 |
| 2017/0173486 A1 * | 6/2017 | Rothschild | | A63H 33/042 |
| 2017/0252664 A1 * | 9/2017 | Cletheroe | | G06T 19/00 |
| 2017/0333803 A1 * | 11/2017 | Brandwijk | | A63H 33/042 |
| 2017/0344127 A1 * | 11/2017 | Hu | | G06F 3/0202 |
| 2018/0221782 A1 * | 8/2018 | Almog | | A63H 33/046 |

OTHER PUBLICATIONS

Kim, S., Song, S. M. & Yoon, Y. (2011). "Smart Learning Services Based on Smart Cloud Computing". *Sensors*, 11(8), 7835-7850. doi: 10.3390/s110807835.

Mel, et al. "The NIST Definition of Cloud Computing". Recommendations of the National Institute of Standards and Technology. Nov. 16, 2015.

\* cited by examiner

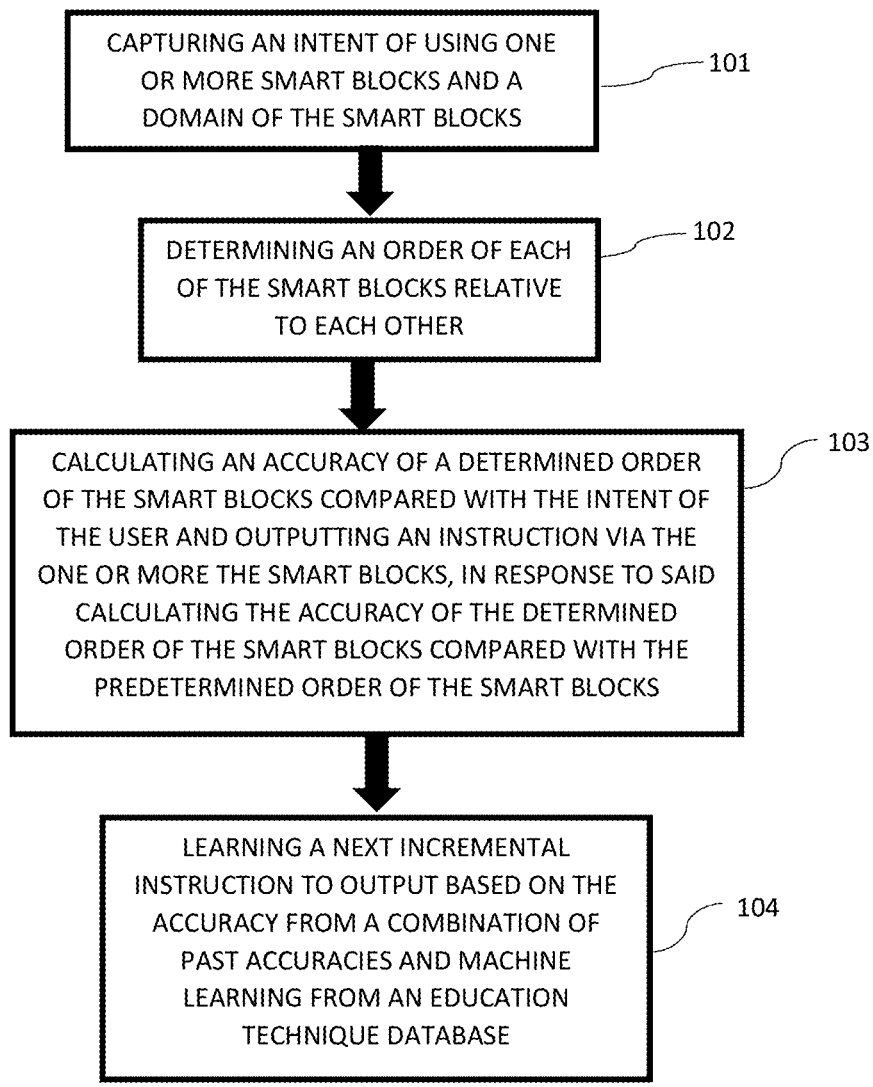

LEARNING WITH SMART BLOCKS

BACKGROUND

The present invention relates generally to a tangible learning environment, and more particularly, but not by way of limitation, to a tangible learning environment with dynamically changing smart blocks.

Users can efficiently learn from building different complex objects with smart blocks, playing with combinations of words, letters, features, etc. Conventional smart blocks are preconfigured (i.e., a static embodiment such as one math game, certain letters, etc.) to one type of learning.

SUMMARY

In an exemplary embodiment, the present invention can provide a computer-implemented smart block control method, the method including capturing an intent of using one or more smart blocks and a domain of the smart blocks, determining an order of each of the smart blocks relative to each other, calculating an accuracy of a determined order of the smart blocks compared with the intent, and outputting an instruction via the one or more the smart blocks, in response to said calculating the accuracy of the determined order of the smart blocks compared with the predetermined order of the smart blocks.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Aspects of the invention will be better understood from the following detailed description of the exemplary embodiments of the invention with reference to the drawings, in which:

BRIEF DESCRIPTION OF DRAWINGS

FIG. 1 exemplarily shows a method according to an embodiment of the present invention;

DETAILED DESCRIPTION

Figure 2A:
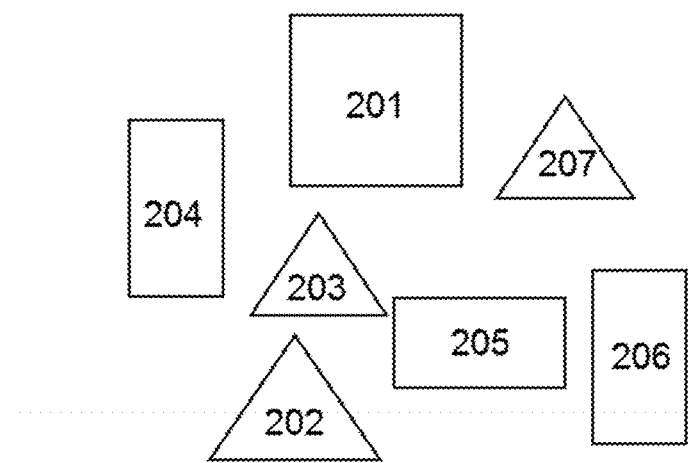
FIGS. 2A-C exemplarily depict smart blocks according to an embodiment of the present invention.

The invention will now be described with reference to FIGS. 1-9, in which like reference numerals refer to like parts throughout. It is emphasized that, according to common practice, the various features of the drawing are not necessarily to scale. On the contrary, the dimensions of the various features can be arbitrarily expanded or reduced for clarity.

By way of introduction of the example depicted in FIG. 1, a smart block control method 100 embodiment according to the present invention can include various steps to continuously support a user's learning path by controlling smart blocks that allow a user to actively embody aspects of the steps into the smart blocks either by the user or remotely through a cognitive agent, that support tangible manipulations to compose smart blocks into complex shapes, and that help in interpretation of the manifested shape such as tell a story through a multimodal interface. By way of introduction of the example depicted in FIG. 7, one or more computers of a computer system 12 according to an embodiment of the present invention can include a memory 28 having instructions stored in a storage system to perform the steps of FIG. 1.

Thus, a smart block control method 100 according to an embodiment of the present invention may act in a more sophisticated, useful and cognitive manner, giving the impression of cognitive mental abilities and processes related to knowledge, attention, memory, judgment and evaluation, reasoning, and advanced computation. In other words, a "cognitive" system can be said to be one that possesses macro-scale properties—perception, goal-oriented behavior, learning/memory and actions generally recognized as cognitive.

Although one or more embodiments may be implemented in a cloud environment 50 (see e.g., FIG. 8), it is nonetheless understood that the present invention can be implemented outside of the cloud environment.

The smart blocks described herein are equipped with sensors capable of detecting sound, light, motion, etc. and can be set to activate in a variety of situations, including via Bluetooth technology and the Internet. The smart blocks can be enabled as an Internet-of-Things (IoT). The smart blocks can emulate senses of sight, smell, taste, hearing, speech, and touch, thereby to embody aspects of learning steps. The smart blocks communicate not only among themselves, but also can adapt to intelligence on a cloud-based system. Although the smart blocks can directly connect with a computer, a tablet, or a phone, they do not require the computer, the tablet, or the phone to support interfacing with the cloud (e.g., the smart blocks can directly connect to the cloud). Through multimodal interaction with smart blocks, users can talk to (speech block), hear from (speaker block), see objects (camera block), sense color (RGB color sensing), touch and write (capacitive touch).

Further, it is noted that smart blocks are a class of digital manipulatives that dynamically allow changing abstract concepts embodied by them. This adaptive embodiment of a smart block is accomplished through embodiment by people such as educators, learners or parents, embodiment by a learning pathway agent, and a manifestation based on people's interactions with smart blocks. The smart blocks represent a change in embodying an abstract concept by changing its properties such as color, shape, visual content (on display), surface texture, and material density to achieve a desired goal.

Referring now to FIG. 1, in step 101, an intent of a smart blocks user can be implied and a domain of the use of the smart blocks captured. It is noted that the domain and intent of the user can be dependent on each other. For example, the domain of the smart blocks can include a smart blocks game for a multiplication table teaching to a young child. The intent of the user may be implied in a domain of the multiplication table teaching, based on a determination that the young child intends to order the smart blocks to form correct mathematical statements. Alternatively, the intent of the user can be implied as indicating that the user is not interested in the smart blocks. That is, the intent of the user can be implied from an understanding of the engagement level of the user with the smart blocks, so that an instruction can be issued such as "do you need an easier game?" or "do you not want to play now?". Different incremental instructions (as described later) can be taken based on an understanding of the specific domains.

That is, the smart blocks can interface with a remote cognitive agent that interprets composition and manifest into new objects, words, sentences, etc. The manifestation process is flexible to support knowledge models from multiple learning domains: from language learning to match and science to social sciences and general knowledge, etc.

In another embodiment, the domain can include a user playing with smart blocks that are embodied as a car and a truck, forming chemical bonds with smart blocks, forming shapes as part of a game, etc. That is, the domain includes the type of game or activity for which the user is using the smart blocks.

Figure 6A:
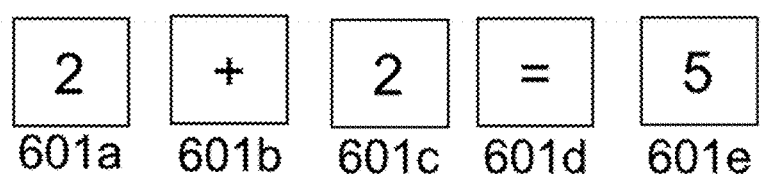
FIG. 6A-C further exemplarily depicts smart blocks according to an embodiment of the present invention.
Figure 6B:
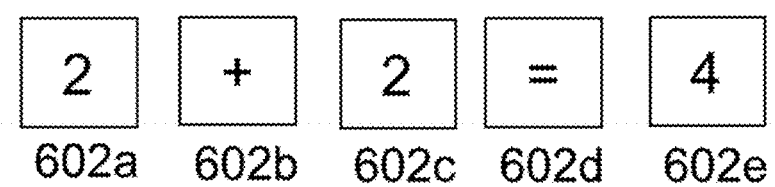
Figure 6C:
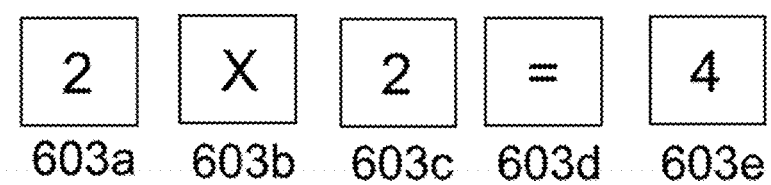

In some embodiments, the intent of the user can be implied by tracing the trajectory of the smart blocks using sensors in the smart blocks. For example, the intent of the user can be implied when a tracing of the trajectory of the smart blocks indicates that the user is attempting to form mathematical relationships as shown in FIGS. 6A-6C. The trajectory of the blocks indicates that the smart blocks are being arranged in a line simulating the mathematical relationships. Or, as discussed above, if the trajectory of the smart blocks indicates that the user is arbitrarily placing (arranging) the smart blocks as shown in FIG. 2A, an intent can be implied that the user is not interested in playing with the smart blocks.

In some embodiments, if the intent of the user is implied from some indication that the user is not interested in playing (learning) with the smart blocks, in step 103 an incremental instruction can be output asking the user if the user wants to play with the blocks.

Also, smart block activities can be unique to each individual user and learned by a cognitive agent of the smart blocks. For example, in some embodiments, the smart blocks include a cognitive agent that can learn and adapt to such smart block activities (also sometimes referred to herein as a user's unique learning path) and correlate them to an intent of the user.

Figure 5:
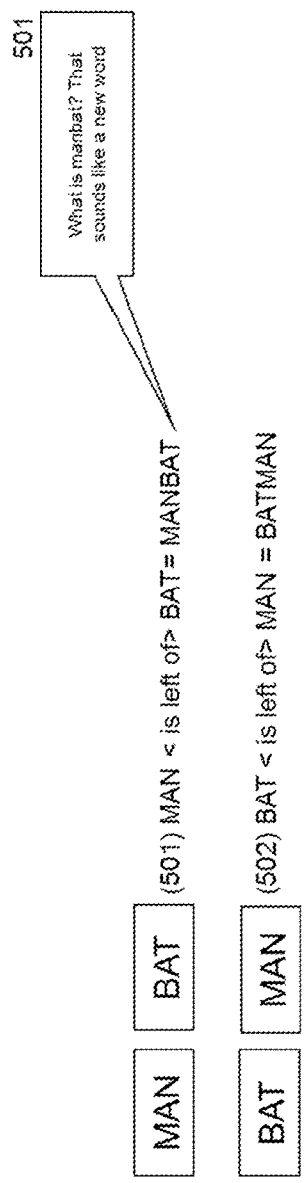
FIG. 5 further exemplarily depicts smart blocks according to an embodiment of the present invention.

In step 102, an order of each of the smart blocks relative to each other is determined. As the user is positioning the blocks relative to each other, the order is detected in order to determine an accuracy of the order of the blocks (as described later). For example, as shown in FIG. 5, the order of the smart blocks "MAN" and "BAT" is determined as "MAN" left of "BAT" in 501 and "BAT" left of "MAN in 502. The position of the smart blocks is determined relative to another smart block using, for example, a "preposition of place" relationship for each block to the other blocks. A position of each block relative to another block can be determined as "in front of", "under", "on the left/right side of", "in the", "on the", "on top of", "behind the", etc. As another example shown in FIG. 6A, block 601a is to the left of blocks 601b, block 601b is to the right of block 601a and left of block 601c, etc.

In step 103, an accuracy of the order of the blocks determined in step 102 is calculated by comparing the order of the blocks with the intent of the user and domain of the smart blocks to output an incremental instruction to the user. The accuracy measures faults or successes of the user in ordering the blocks. For example, as shown in FIG. 6A, the order of the blocks contains a "fault" or "error" (i.e., block 601e to the right of the blocks 601a, 601b, 601c, and 601d is an incorrect mathematical relationship).

For example, in step 103, an accuracy of a determined order of the smart blocks compared with the intent of the user is calculated to output an instruction (or an incremental instruction) via the one or more the smart blocks, in response to the calculating the accuracy of the determined order of the smart blocks compared with the predetermined order of the smart blocks.

In step 103, the "fault" in FIG. 6A is determined and an incremental instruction is output to the user indicating the fault. The incremental instruction can include a voice output from the smart blocks informing the user that "The answer is not correct. Please try again". The user can then "re-order" the smart blocks as shown in FIG. 6A in which a different block 602e is placed to the right of the equals sign of block 602d. Since the blocks were re-ordered, step 102 re-calculates the order of the blocks and the accuracy of the order of the blocks is again determined in step 103. Because the order of the blocks is determined as correct (i.e., the accuracy is of the order is correct), a different incremental instruction to the user is output.

The different incremental instruction is determined from a database including teaching/learning techniques (as described later). Therefore, an incremental instruction in response to a correct arrangement of the smart blocks includes a next step for incremental learning. As shown in FIG. 6C, the incremental instruction can include an instruction requesting the user change the addition operator in the mathematical relationship with a multiplier and that the answer will still be correct. In this manner, the user may incrementally learn the relationship between addition and multiplication via the incremental instruction.

In step 104, a next incremental instruction to output is learned based on the accuracy from a combination of past accuracies of ordering the blocks by the user and machine learning from an education technique database. In other words, if a "fault" is detected in the order of the blocks or a "correct" order of the blocked is detected (i.e., the accuracy value), a next incremental instruction is learned to provide the user with an instruction on how to correct their error or learn the next incremental step in the domain. For example, teaching manuals, research papers on learning styles of individuals, teaching technique documents, etc. can be data mined and combined with the past learning of the user to determine an optimal next incremental instruction to provide the user to maximize their learning with the smart blocks. Step 104 can learn about a child's learning process and adapts the embodied blocks to support learning process with the optimal next incremental instruction instead of only creating a game experience.

Therefore, steps 101-104 can allow for a user to continuously learn with smart blocks by instantiating the domain of the use of the smart blocks and implying the intent of the from a determined order of the blocks relative to each other using, for example, preposition of place. The accuracy of the order of the blocks can be determined to engage with dialogue (or the like) with the user (or a third party such as a teacher or parent) to provide the user with guidance (i.e., an incremental instruction) which allows the user to continuously learn from the using of the smart blocks.

Figure 2B:
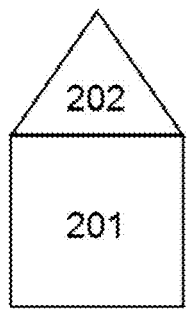
Figure 2C:
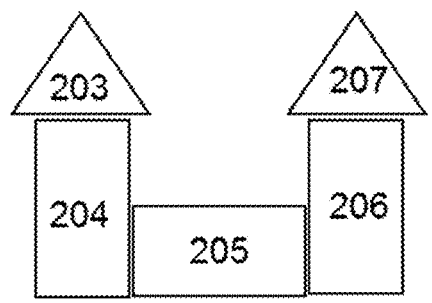

FIGS. 2A-2C exemplarily depict one embodiment of a set of smart blocks and a user using the smart blocks to form various shapes. The domain of the smart blocks is forming various composite objects reflecting a story that they are reading such as a house or a castle in the story and the intent of the user is determined to create these various composite objects from their set of blocks depicted in FIG. 2A. As shown in FIG. 2B, the accuracy of the order of the blocks is determined to be correct by using an edge detection technique and identifies through vision analytics closest objects that the composite assembly looks like (i.e., block 202 is on top of block 201 forming a "house"). An incremental instruction can be output to the user such as "Great! You have created a house just like the character in the story. Can you create a castle that the character can also live in?". As shown in FIG. 2C, the order of the blocks is re-calculated and the accuracy of the order is determined to be correct. Another incremental instruction can be output such as "That is a great castle! Please keep reading the story to see what happens next.". The user can then continue to read the story after he has demonstrated that he can create the composite objects discussed in the story. It is noted that if the user was unable to form a house (i.e., an accuracy of the order is determined as faulty), an incremental instruction can ask the user to look at the pictures in the story book and use their blocks to make the shape of the house.

Figure 3A:
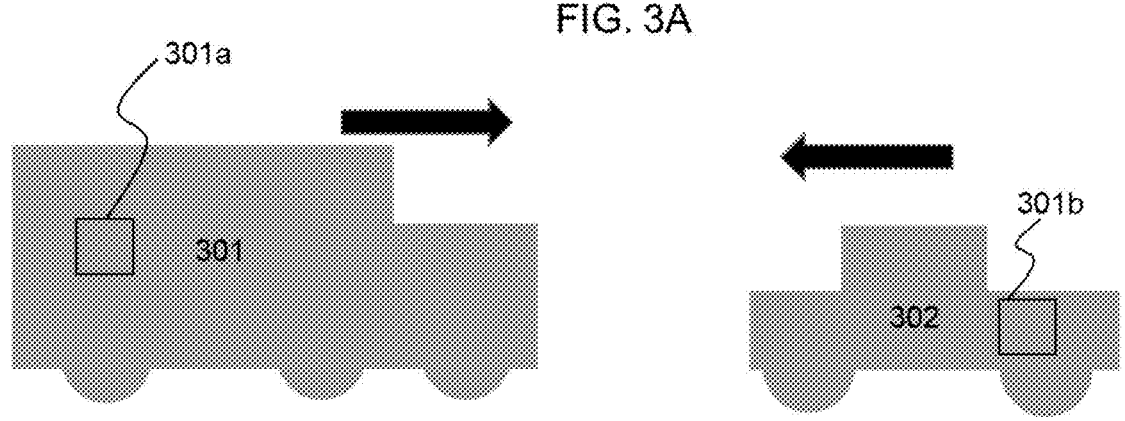
FIGS. 3A-B further exemplarily depict smart blocks according to an embodiment of the present invention.
Figure 3B:
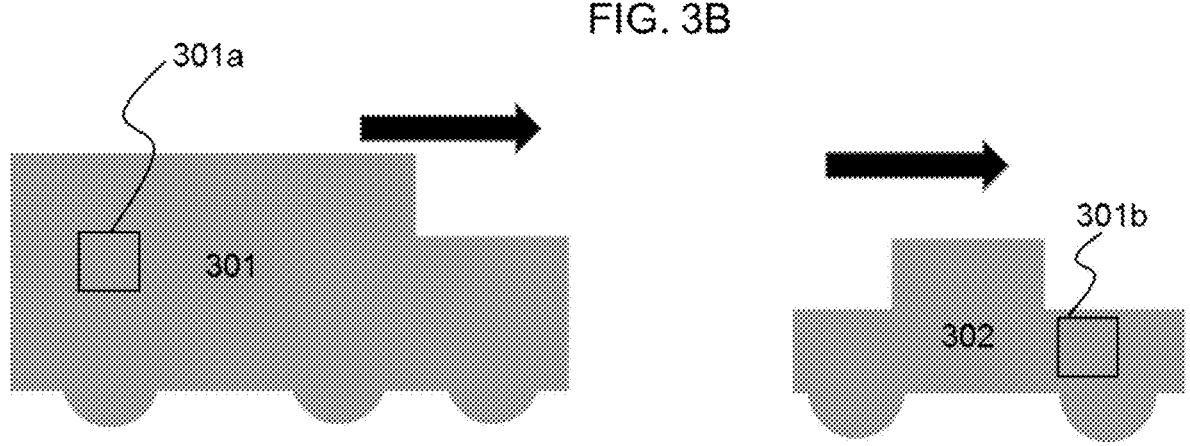

In some embodiments, as shown in FIGS. 3A and 3B, the domain can include an "action" sequence to teach a user about relational awareness of objects and cause/effect. In FIG. 3A, the intent of the user is to "play with cars". The order of the smart blocks is calculated by data from sensor 301a of the truck 301 and sensor 301b of the car 302. The order shows that the truck 301 is "to the left of" the car 302 and in addition to the static order, the sensors of the car and truck provide data that the truck 301 is being moved towards the car 302. In step 103, the accuracy determined indicates that the user may be incorrectly causing a collision between the vehicles and the incremental instruction is output to state that "Someone may be hurt in the car crashing the truck into the car because the size of the truck is much larger than the car. You can try moving them in the same direction to avoid an accident!". That is, the incremental instruction can teach the user about relational awareness of the objects that they can crash into each other and that if a truck crashes into a car a bad effect may occur. Thus, the user can learn that cars and trucks should not collide. As the user changes the direction of the motion of the vehicles in FIG. 3B, the order is re-calculated and step 103 can output an incremental instruction such "Good job! Cars and Trucks are intended to be on the road together but not hit each other".

Alternatively, the domain can include results of movement of the smart blocks such as if the smart blocks represent tectonic plates. For example, tectonic plates shifting and moving can represent different results such as earthquakes, mountains forming, etc. by the force and speed at which the tectonic plates move. The smart blocks can include sensors that detect the motion and output instructions to ask the user to simulate the cause of an earthquake. The user then can move the smart blocks and the order is calculated by determining if the movement and speed of movements simulates an earthquake-creating event. If the user accurately moved the tectonic plate blocks, the incremental instruction can ask the user to perform a different action for the user to further learn about tectonic plates.

Figure 4:
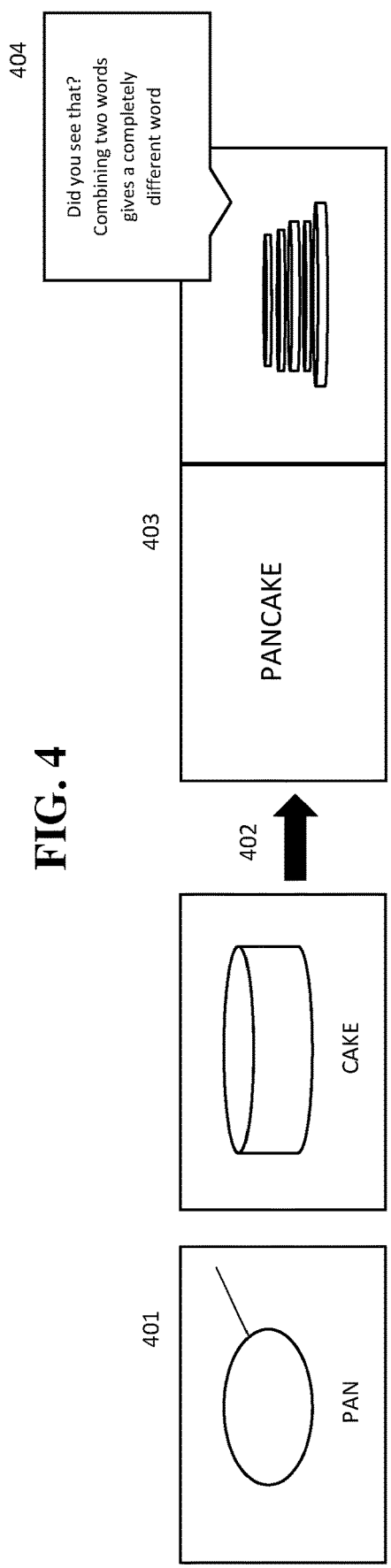
FIG. 4 further exemplarily depicts smart blocks according to an embodiment of the present invention.

FIGS. 4 and 5 exemplarily depict another embodiment of the invention. In 401 of FIG. 4, the blocks consisting of the letters "PAN" are depicted to the left of and spaced from "CAKE". The domain is determined as forming words and the intent to learn new vocabulary by moving blocks. The user then re-orders the blocks in 402 to place "PAN" to the left of and contacting an edge of "CAKE." Based on the re-ordering accurately creating a new word (i.e., accuracy is correct), an incremental instruction can be output indicating that the user has correctly formed a new word (e.g., "Did you see that? "Combining two words gives a completely different word"). Similarly, as shown in FIG. 5, the blocks in 501 "MAN" is left of "BAT". The initial accuracy is determined as faulty and an incremental instruction is output suggesting that the user should correct (by reordering) the blocks (e.g., "What is a "manbat?" That does not sound like a real word").

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
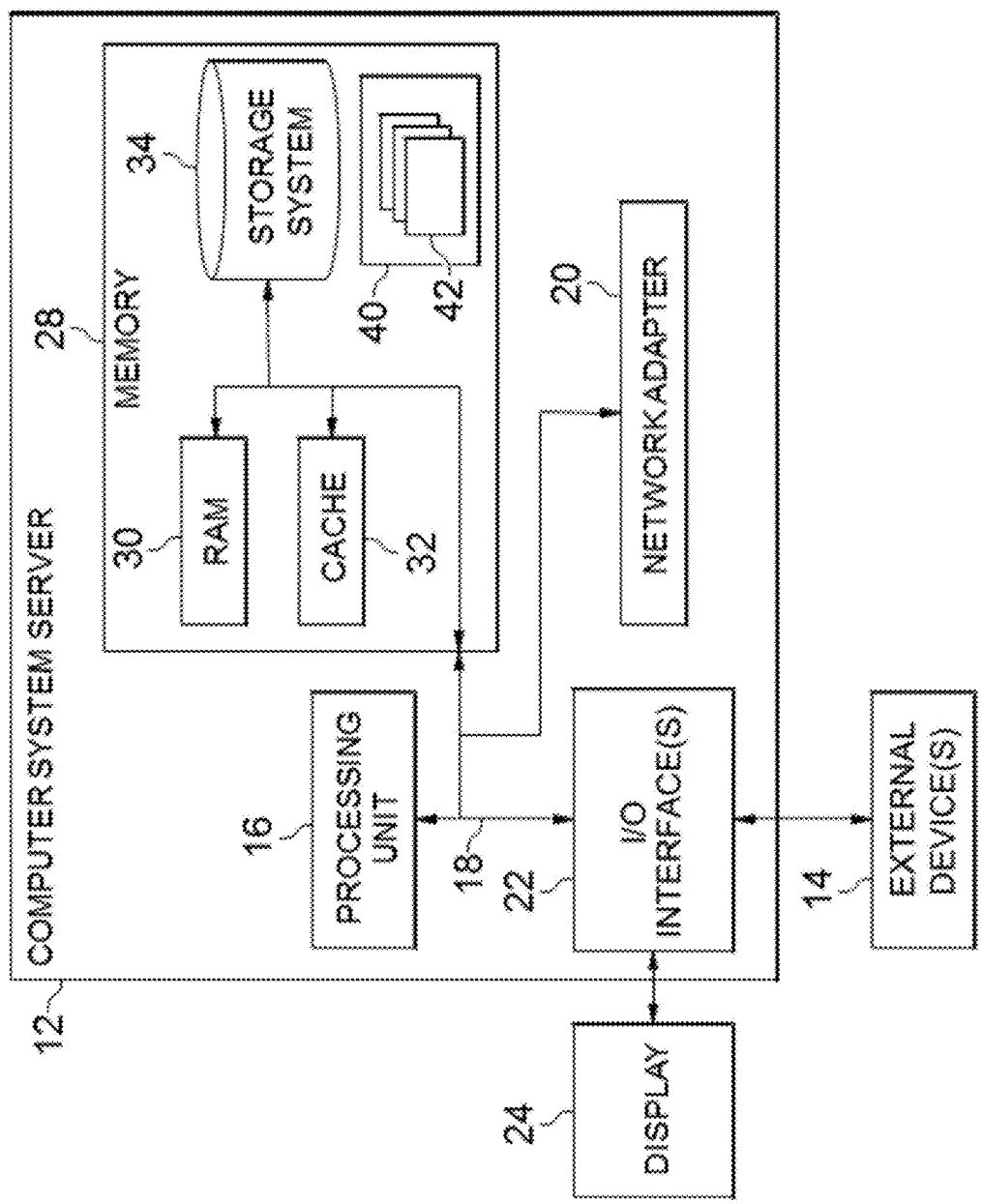
FIG. 7 exemplarily depicts a system according to an embodiment of the present invention.

Referring now to FIG. 7, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

FIG. 7 depicts a system according to an embodiment of the present invention.

In the example depicted in FIG. 7, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 8:
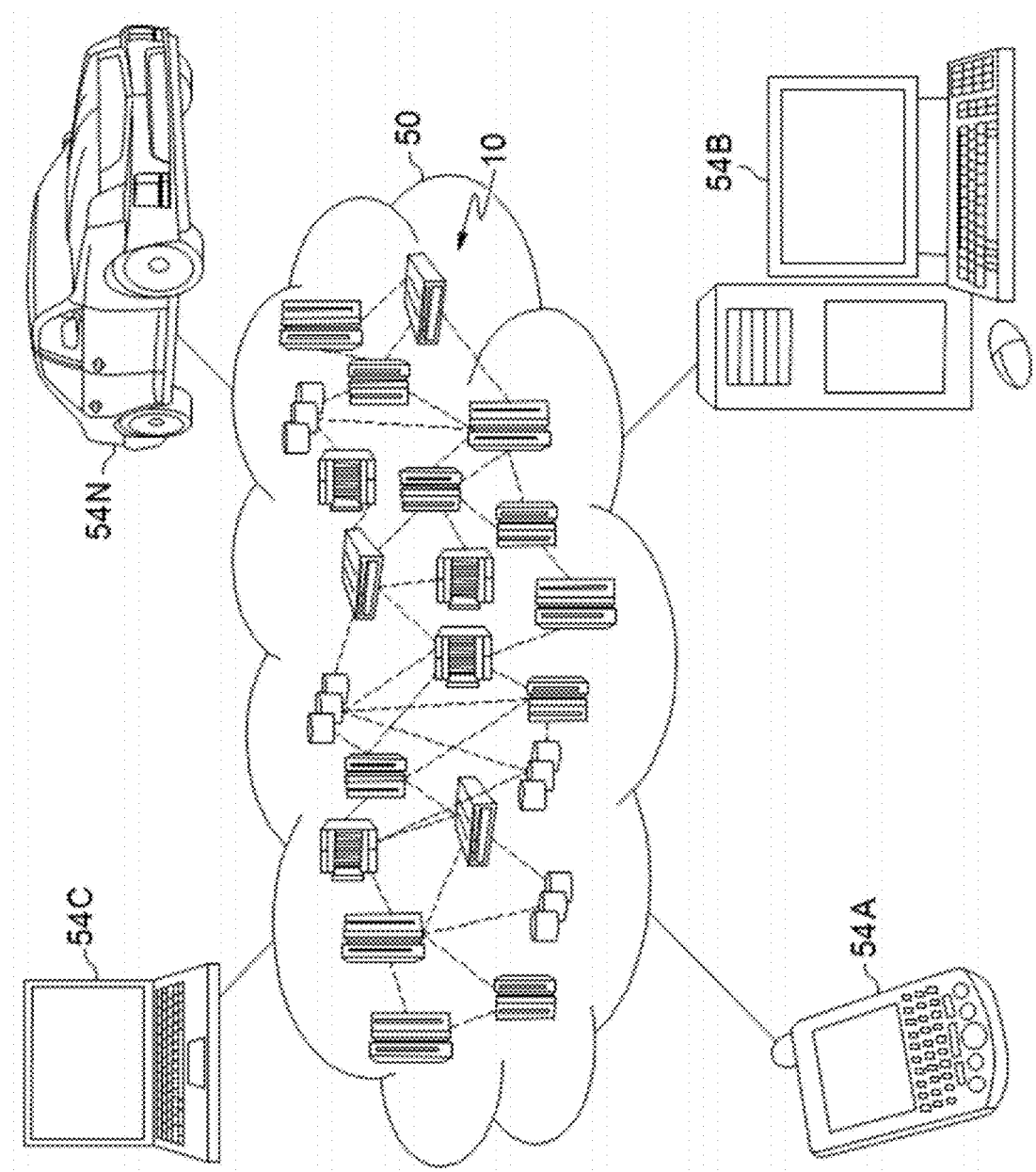
FIG. 8 exemplarily depicts a cloud-computing environment according to an embodiment of the present invention.

FIG. 8 depicts an example of a cloud computing environment according to an embodiment of the present invention. As shown, cloud computing environment 50 comprises one or more cloud computing nodes 10, one or more of which may include system 12, with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Figure 9:
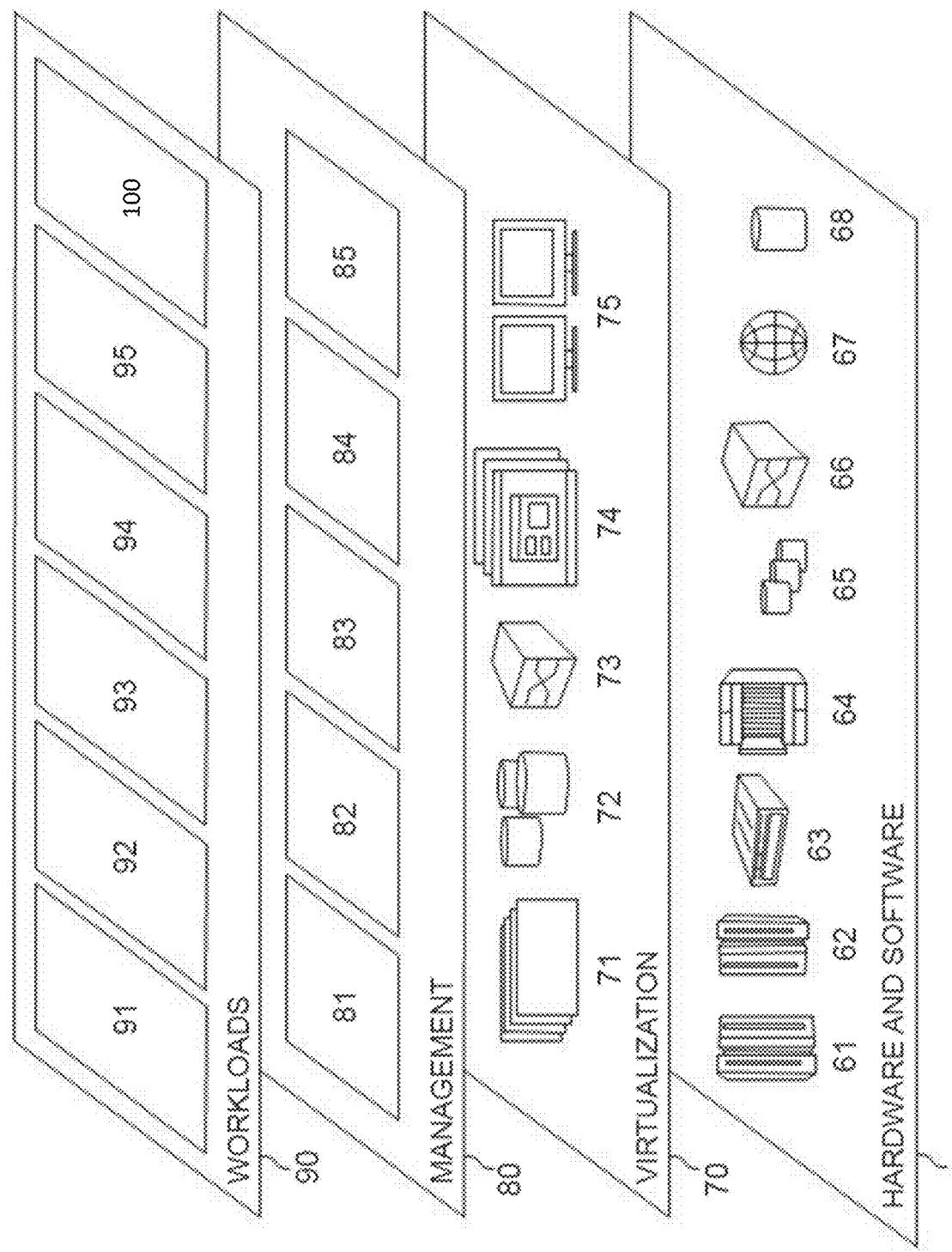
FIG. 9 exemplarily depicts abstraction model layers according to an embodiment of the present invention.

FIG. 9 depicts an exemplary set of functional abstraction layers according to an embodiment of the present invention. In some embodiments, such functional abstraction layers can be implemented in cloud computing environment 50 (FIG. 8). It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and smart block control processing 100 (i.e., the method 100) in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented smart block control method for controlling a plurality of smart blocks operating in concert with each other, each of the plurality of smart blocks including: a processor and a memory, operably coupled to the processor, the method comprising:
   capturing an intent of a user using one or more smart blocks by tracking:
      a tangible movement of the smart blocks by the user via a sensor and the processor included in the smart blocks; and a domain of the smart blocks;

determining, via a position of the processor relative to another processor, an order of each of the smart blocks relative to each other;

calculating an accuracy of a determined order of the smart blocks compared with the intent of the user by determining a geometric shape made by the order of the smart blocks relative to each other based on a positional change and a resultant position of the smart blocks via the sensor included in each of the smart blocks; and outputting an instruction via the processor of the one or more smart blocks to the user, in response to said calculating the accuracy of the determined order of the smart blocks compared with the predetermined order of the smart blocks such that the user follows the instruction to increase the accuracy, wherein the smart blocks comprise blocks of different shapes in varying sizes suitable to arranging side-by-side and arranged for stacking, wherein the smart blocks comprise digital manipulatives, that are manipulative via the processor installed in each of the smart blocks, that dynamically allow changing abstract concepts embodied by the smart blocks when the smart blocks are combined and associated with each other in the determined order as determined by the processor, wherein the order of the smart blocks relative to each other is determined without a physical connection to a mateable part or a sensor of the blocks, wherein the accuracy indicates a fault in the order of the smart blocks or a success in the order of the smart blocks, wherein the instruction includes an instruction requesting the user to correct the order of the smart blocks if the accuracy indicates the fault in the order of the smart blocks, wherein the instruction includes an instruction for a next incremental learning step in the domain if the accuracy indicates the success in the order of the smart blocks, and wherein the instruction includes an instruction for a next instructional learning step in the domain if the accuracy indicates the success in the order of the smart blocks.

2. The computer-implemented method of claim 1, embodied in a cloud-computing environment.

3. A smart block control system for controlling a plurality of smart blocks operating in concert with each other each of the plurality of smart blocks including: a smart block processor and a smart block memory, operably coupled to the processor, said system comprising:

a processor; and a memory, operably coupled to the processor, the memory storing instructions to cause the processor to perform:

capturing an intent of a user using one or more smart blocks tracking:

a tangible movement of the smart blocks by the user via a sensor and the smart block processor included in the smart blocks; and a domain of the smart blocks;

determining, via a position of the smart block processor relative to, another smart block, processor, an order of each of the smart blocks relative to each other;

calculating an accuracy of a determined order of the smart blocks compared with the intent of the user by determining a geometric shape, made by the order of the smart blocks relative to each other based on a positional change and a resultant position of the smart blocks via the sensor included in each of the smart blocks; and outputting an instruction processor of the one or more smart blocks to the user, in response to said calculating the accuracy of the determined order of the smart blocks compared with the predetermined order of the smart blocks such that the user follows the instruction to increase the accuracy, wherein the smart blocks comprise blocks of different shapes in varying sizes suitable to arranging side-by-side and arranged for stacking, wherein the smart blocks comprise digital manipulatives, that are manipulative via the smart block processor installed in each of the smart blocks, that dynamically allow changing abstract concepts embodied by the smart blocks when the smart blocks are combined and associated with each other in the determined order as determined by the processor, wherein the order of the smart blocks relative to each other is determined without a physical connection to a mateable part or a sensor of the blocks, wherein the accuracy indicates a fault in the order of the smart blocks or a success in the order of the smart blocks, wherein the instruction, includes an instruction requesting the user to correct the order of the smart blocks if the accuracy indicates the fault in the order of the smart blocks, wherein the instruction includes an instruction for a next incremental learning step in the domain if the accuracy indicates the success in the order of the smart blocks, and wherein the instruction includes an instruction for a next instructional learning step in the domain if the accuracy indicates the success in the order of the smart blocks.

4. The system of claim 3, further comprising a cloud-computing environment.

* * * * *